US011931947B2

(12) United States Patent
Ozaki et al.

(10) Patent No.: US 11,931,947 B2
(45) Date of Patent: Mar. 19, 2024

(54) METHOD FOR PRODUCING RESIN CONTAINER, INJECTION CORE MOLD, MOLD FOR INJECTION MOLDING, AND DEVICE FOR PRODUCING RESIN CONTAINER

(71) Applicant: NISSEI ASB MACHINE CO., LTD., Nagano (JP)

(72) Inventors: Yasuo Ozaki, Nagano (JP); Yoichi Tsuchiya, Nagano (JP); Toshiteru Oike, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 158 days.

(21) Appl. No.: 17/600,782

(22) PCT Filed: Mar. 31, 2020

(86) PCT No.: PCT/JP2020/014858
§ 371 (c)(1),
(2) Date: Oct. 1, 2021

(87) PCT Pub. No.: WO2020/204040
PCT Pub. Date: Oct. 8, 2020

(65) Prior Publication Data
US 2022/0176608 A1     Jun. 9, 2022

(30) Foreign Application Priority Data

Apr. 4, 2019  (JP) ................................. 2019-071910
Apr. 4, 2019  (JP) ................................. 2019-071911

(51) Int. Cl.
*B29C 49/06*     (2006.01)
*B29B 11/08*     (2006.01)
(Continued)

(52) U.S. Cl.
CPC ............ *B29C 49/062* (2013.01); *B29B 11/08* (2013.01); *B29B 11/14* (2013.01); *B29C 45/37* (2013.01);
(Continued)

(58) Field of Classification Search
CPC ..... B29C 49/071; B29C 45/37; B29C 49/062; B29C 49/6427; B29C 2049/023;
(Continued)

(56) References Cited

U.S. PATENT DOCUMENTS 3,170,010 A * 2/1965 Schultz ................ B29C 44/445
425/441
3,816,580 A   6/1974 Valyi
(Continued)

FOREIGN PATENT DOCUMENTS

BE     793049     4/1973
CA    2596786     9/2006
(Continued)

OTHER PUBLICATIONS

International Search Report issued in International Patent Application No. PCT/JP2020/014858, dated Jun. 23, 2020, along with an English translation thereof.

(Continued)

*Primary Examiner* — Monica A Huson
(74) *Attorney, Agent, or Firm* — Greenblum & Bernstein, P.L.C.

(57) ABSTRACT

A method for manufacturing a resin container, the method including: injection-molding a bottomed preform made of resin; and blow-molding the preform to manufacture a resin container, in which the injection molding includes filling a cavity formed by at least an injection core mold and an injection cavity mold with a molten resin to form the preform, and a first groove that extends from a bottom (Continued)

portion defining portion to a neck portion defining portion is formed in a surface of the body portion defining portion of the injection core mold.

14 Claims, 5 Drawing Sheets

(51) Int. Cl.
  *B29B 11/14* (2006.01)
  *B29C 45/37* (2006.01)
  *B29C 49/64* (2006.01)
  *B29C 49/78* (2006.01)
  *B29L 31/00* (2006.01)

(52) U.S. Cl.
  CPC .......... *B29C 49/6427* (2013.01); *B29C 49/78* (2013.01); *B29L 2031/712* (2013.01)

(58) Field of Classification Search
  CPC ........ B29C 49/6435; B29C 2949/0741; B29C 49/643; B29C 49/78; B29C 2949/0715; B29C 2949/0867; B29C 33/00; B29C 39/26; B29C 66/72521; B29B 11/08; B29B 11/14; B29L 2031/712
  See application file for complete search history.

(56) References Cited

U.S. PATENT DOCUMENTS

| | | |
|---|---|---|
| 3,868,202 A | 2/1975 | Valyi |
| 3,929,954 A | 12/1975 | Valyi |
| 4,261,948 A * | 4/1981 | Krishnakumar ........ B29C 45/26 264/537 |
| 6,413,075 B1 | 7/2002 | Koch et al. |
| 2003/0108695 A1 | 6/2003 | Freek et al. |
| 2008/0277840 A1 | 11/2008 | Yanagimachi et al. |
| 2009/0220809 A1 | 9/2009 | Bertheol et al. |
| 2012/0094043 A1 | 4/2012 | Bertheol et al. |
| 2012/0193838 A1 | 8/2012 | Bock et al. |
| 2014/0131920 A1 | 5/2014 | Nakahara |
| 2014/0199520 A1 | 7/2014 | Bertheol et al. |
| 2016/0361860 A1 | 12/2016 | Nakahara |
| 2020/0238594 A1 | 7/2020 | Sato et al. |

FOREIGN PATENT DOCUMENTS

| | | |
|---|---|---|
| CN | 101394978 | 3/2009 |
| JP | 61-197220 A | 9/1986 |
| JP | 63-141719 A | 6/1988 |
| JP | 3-234604 A | 10/1991 |
| JP | 11-147249 A | 6/1999 |
| JP | 3573374 B2 | 10/2004 |
| JP | 2007-1187 A | 1/2007 |
| JP | 2008-279611 A | 11/2008 |
| JP | 6326790 B2 | 5/2018 |
| WO | 2013/012067 A1 | 1/2013 |
| WO | 2019/022231 A1 | 1/2019 |

OTHER PUBLICATIONS

Written Opinion of the International Searching Authority issued in International Application No. PCT/JP2020/014858, dated Jun. 23, 2020, along with an English translation thereof.
Notification of Reasons for Revocation (Office Action) in Japanese Counterpart Patent Appl. No. 2020-544062, dated Jul. 15, 2021, along with an English translation thereof.
Partial Supplementary European Search Report issued to the corresponding European Patent Application No. 20783752.7. dated Dec. 5, 2023.
Office Action issued in Corresponding CN Patent Application No. 202080033652.9, dated Mar. 2, 2023, along with an English translation thereof.
Extended European Search Report issued in Corresponding EP Patent Application No. 20783752.7, dated Apr. 13, 2023.

* cited by examiner

METHOD FOR PRODUCING RESIN CONTAINER, INJECTION CORE MOLD, MOLD FOR INJECTION MOLDING, AND DEVICE FOR PRODUCING RESIN CONTAINER

TECHNICAL FIELD

The present invention relates to a method for manufacturing a resin container, an injection core mold, an injection molding mold, and an apparatus for manufacturing the resin container.

BACKGROUND ART

Patent Literature 1 discloses a method in which, when a molten resin is injected and filled into an injection cavity to form a preform and a secondary pressure is applied to the preform in a molten state to maintain the pressure, a gas having a required pressure is injected into a boundary between the preform and an injection core. In this method, an inner surface of the preform and a surface of the core are separated from each other by the pressure of the gas, and the preform is pressed against a surface of the cavity to perform pressure-maintaining cooling.

Patent Literature 2 discloses a preform molding mold in which, in a core-side molding mold positioned on an inner surface side of a preform, a surface of a portion corresponding to an inner surface of the preform in the vicinity of a tip end of a mouth and a surface of a portion corresponding to the inner surface of the preform facing a protrusion are mirror-finished surfaces, and other surfaces are embossed surfaces.

CITATION LIST

Patent Literature

Patent Literature 1: Japanese Patent No. 3573374
Patent Literature 2: Japanese Patent No. 6326790

SUMMARY OF INVENTION

Technical Problem

When a molding cycle time is shortened by significantly shortening a preform molding time, particularly, a cooling time in an injection molding part, the preform is released from the mold in a high-temperature state in the injection molding part. In the preform in the high-temperature state, since a skin layer in a hardened state is thin and a core layer in a softened state is thick, the preform is easily deformed when released from the mold.

Patent Literature 1 discloses a means for eliminating a mold release defect by introducing the gas between the injection core mold and the preform during mold release, but this makes a mold and mechanical structure complicated and also increases the number of components, which may lead to an increase in cost. In the mold of Patent Literature 2, the core mold is embossed to facilitate removal of the core mold from the preform cooled in an injection molding step, but a problem in removal of the core mold from the preform in a high-temperature state is not mentioned.

An object of the present invention is to provide a method for manufacturing a resin container, an injection core mold, an injection molding mold, and an apparatus for manufacturing the resin container, which can appropriately release a preform even in a short molding cycle time and manufacture a high-quality resin container.

Solution to Problem

A method for manufacturing a resin container according to the present disclosure that can solve the above-described problem is a method for manufacturing a resin container, the method including:
  an injection molding step of injection-molding a bottomed preform made of resin; and
  a blow molding step of blow-molding the preform to manufacture a resin container,
  in which the injection molding step includes a filling step of filling a cavity formed by at least an injection core mold and an injection cavity mold with a molten resin to form a preform,
  in which the injection core mold includes:
    a bottom portion defining portion configured to define a shape of a bottom portion of the preform;
    a body portion defining portion configured to define a shape of a body portion of the preform; and
    a neck portion defining portion configured to define a shape of a neck portion of the preform, and
  in which a groove that extends from the bottom portion defining portion to the neck portion defining portion is formed in a surface of the body portion defining portion.

An injection core mold according to the present disclosure that can solve the above-described problem is an injection core mold for injection-molding a bottomed preform made of resin, the injection core mold including:
  a bottom portion defining portion configured to define a shape of a bottom portion of the preform;
  a body portion defining portion configured to define a shape of a body portion of the preform; and
  a neck portion defining portion configured to define a shape of a neck portion of the preform,
  in which a groove that extends from the bottom portion defining portion to the neck portion defining portion is formed in a surface of the body portion defining portion.

An injection molding mold according to the present disclosure that can solve the above-described problem is an injection molding mold including:
  the above-described injection core mold; and
  an injection cavity mold for injection-molding the bottomed preform made of resin,
  in which the injection cavity mold includes
    an inner bottom portion configured to define an outer shape of the bottom portion of the preform,
    an inner wall portion configured to define an outer shape of the body portion of the preform, and
    an opening portion positioned on a side opposite to the inner bottom portion with the inner wall portion being provided between the opening portion and the inner bottom portion, and
  in which a groove that extends from the inner bottom portion to the opening portion is formed in a surface of the inner wall portion.

An apparatus for manufacturing a resin container according to the present disclosure that can solve the above-described problem is an apparatus for manufacturing a resin container, the apparatus including:
  an injection molding part configured to injection-mold a bottomed preform made of resin; and a blow molding part configured to blow-mold the preform to manufacture a resin container, in which the injection molding part includes the above-described injection core mold.

A method for manufacturing a resin container according to the present disclosure that can solve the above-described problem is a method for manufacturing a resin container, the method including:

an injection molding step of injection-molding a bottomed preform made of resin;

a temperature adjustment step of adjusting a temperature of the injection-molded preform while cooling the preform; and a blow molding step of blow-molding the temperature-adjusted preform to manufacture a resin container, in which the injection molding step includes a filling step of filling a cavity formed by at least an injection core mold and an injection cavity mold with a molten resin to form the preform, in which the injection core mold includes a body portion defining portion configured to define a shape of a body portion of the preform, in which the temperature adjustment step includes a sandwiching step of sandwiching the preform between a temperature adjustment cavity mold and a temperature adjustment core mold, in which the temperature adjustment core mold includes a body portion contact portion in contact with the body portion of the preform in the sandwiching step, and in which a center line average roughness Ra1 of a surface of the body portion defining portion of the injection core mold in a circumferential direction is larger than a center line average roughness Ra2 of a surface of the body portion contact portion of the temperature adjustment core mold in a circumferential direction.

Advantageous Effects of Invention

According to the present invention, it is possible to provide a method for manufacturing a resin container, an injection core mold, an injection molding mold, and an apparatus for manufacturing the resin container, which can appropriately release a preform even in a short molding cycle time and manufacture a high-quality resin container.

DESCRIPTION OF EMBODIMENTS

Hereinafter, an embodiment of the present invention will be described with reference to the drawings. Dimensions of each member shown in the drawings may be different from the actual dimensions of each member for convenience of description.

Figure 1:
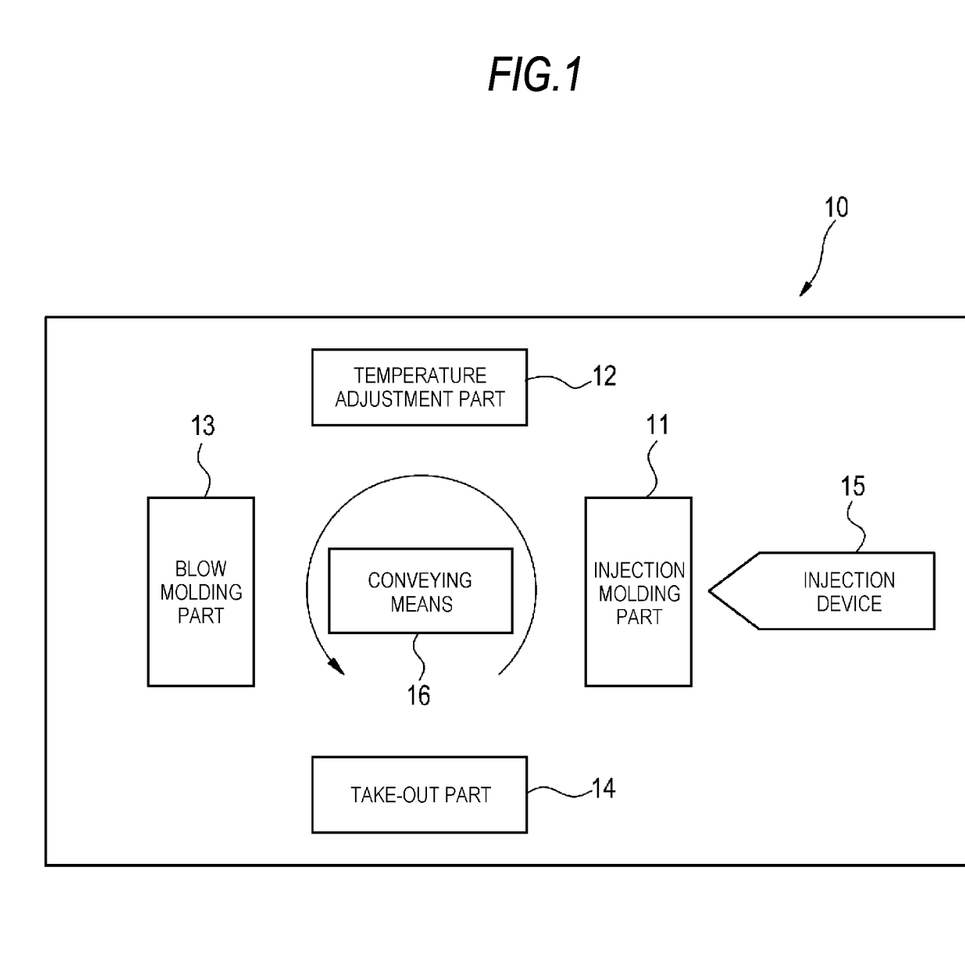
FIG. 1 is a functional block diagram of an apparatus for manufacturing a resin container.

First, a manufacturing apparatus 10 for manufacturing a resin container will be described with reference to FIG. 1. FIG. 1 is a functional block diagram of the manufacturing apparatus 10.

As shown in FIG. 1, the manufacturing apparatus 10 includes an injection molding part 11 for manufacturing a preform and a temperature adjustment part 12 for adjusting a temperature of the manufactured preform. An injection device 15 that supplies a resin material, which is a raw material, is connected to the injection molding part 11. Further, the manufacturing apparatus 10 includes a blow molding part (an example of a blow device) 13 for blowing a preform to manufacture a container, and a take-out part 14 for taking out the manufactured container.

Figure 2:
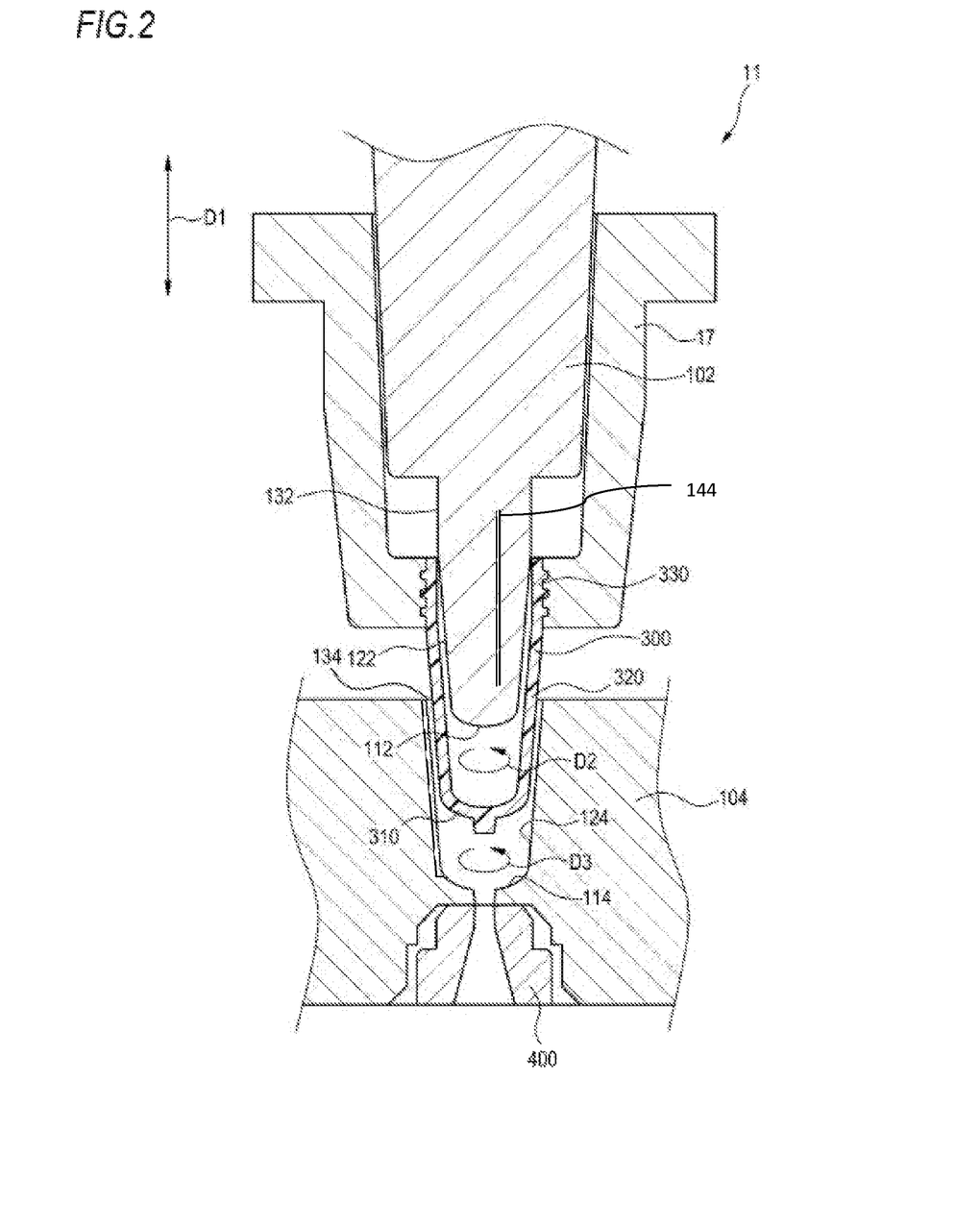
FIG. 2 is a diagram showing a configuration of an injection molding part.
Figure 4:
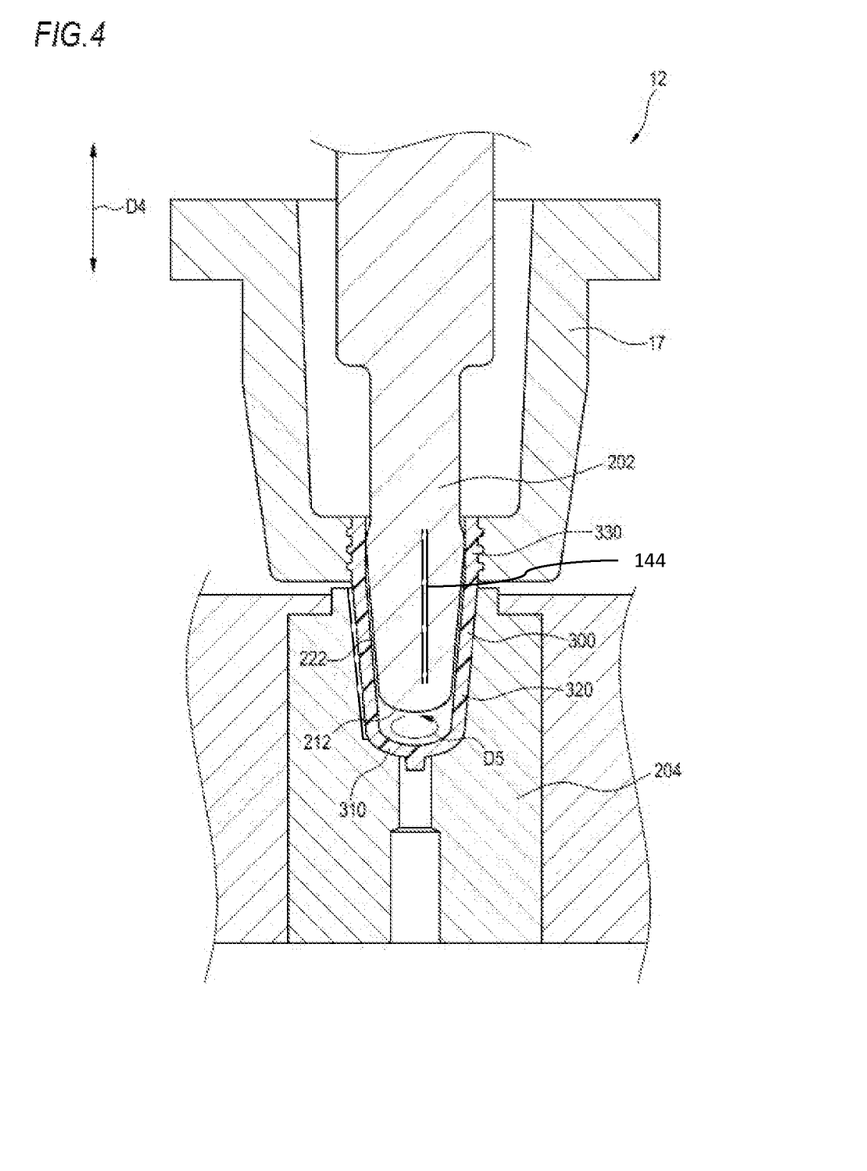
FIG. 4 is a diagram showing a configuration of a temperature adjustment part.

The injection molding part 11, the temperature adjustment part 12, the blow molding part 13, and the take-out part 14 are provided at positions rotated by a predetermined angle (90 degrees in the present embodiment) about a conveying means 16. The conveying means 16 is configured with a rotating plate or the like. As shown in FIGS. 2 and 4 described later, a preform 300 or a container in a state where a neck portion 330 thereof is supported by a neck mold 17 attached to the rotating plate is configured to be conveyed to each part as the rotating plate rotates.

Here, the injection molding part 11 will be described with reference to FIG. 2. FIG. 2 is a schematic cross-sectional view showing an aspect of the injection molding part 11. The injection molding part 11 includes an injection molding mold including an injection core mold 102 and an injection cavity mold 104. The injection molding part 11 is configured to form the preform 300 by pouring a synthetic resin material such as a polyester resin (for example, polyethylene terephthalate (PET)) into a cavity formed by clamping the injection core mold 102, the injection cavity mold 104, and the neck mold 17 (by filling the cavity with a molten resin). The preform 300 has an optimum thickness distribution (shape) depending on the container.

The injection core mold 102 includes a bottom portion defining portion 112 that defines a shape of a bottom portion 310 of the preform 300, a body portion defining portion 122 that defines a shape of a body portion 320 of the preform 300, and a neck portion defining portion 132 that defines a shape of the neck portion 330 of the preform 300. The bottom portion defining portion 112 and the body portion defining portion 122 are continuous with each other, and the body portion defining portion 122 and the neck portion defining portion 132 are continuous with each other. A portion of the injection core mold 102 including the bottom portion defining portion 112, the body portion defining portion 122, and the neck portion defining portion 132 is tapered. The injection core mold 102 is configured to be able to move up and down in an upper-lower direction D1 in FIG. 2.

Figure 3:
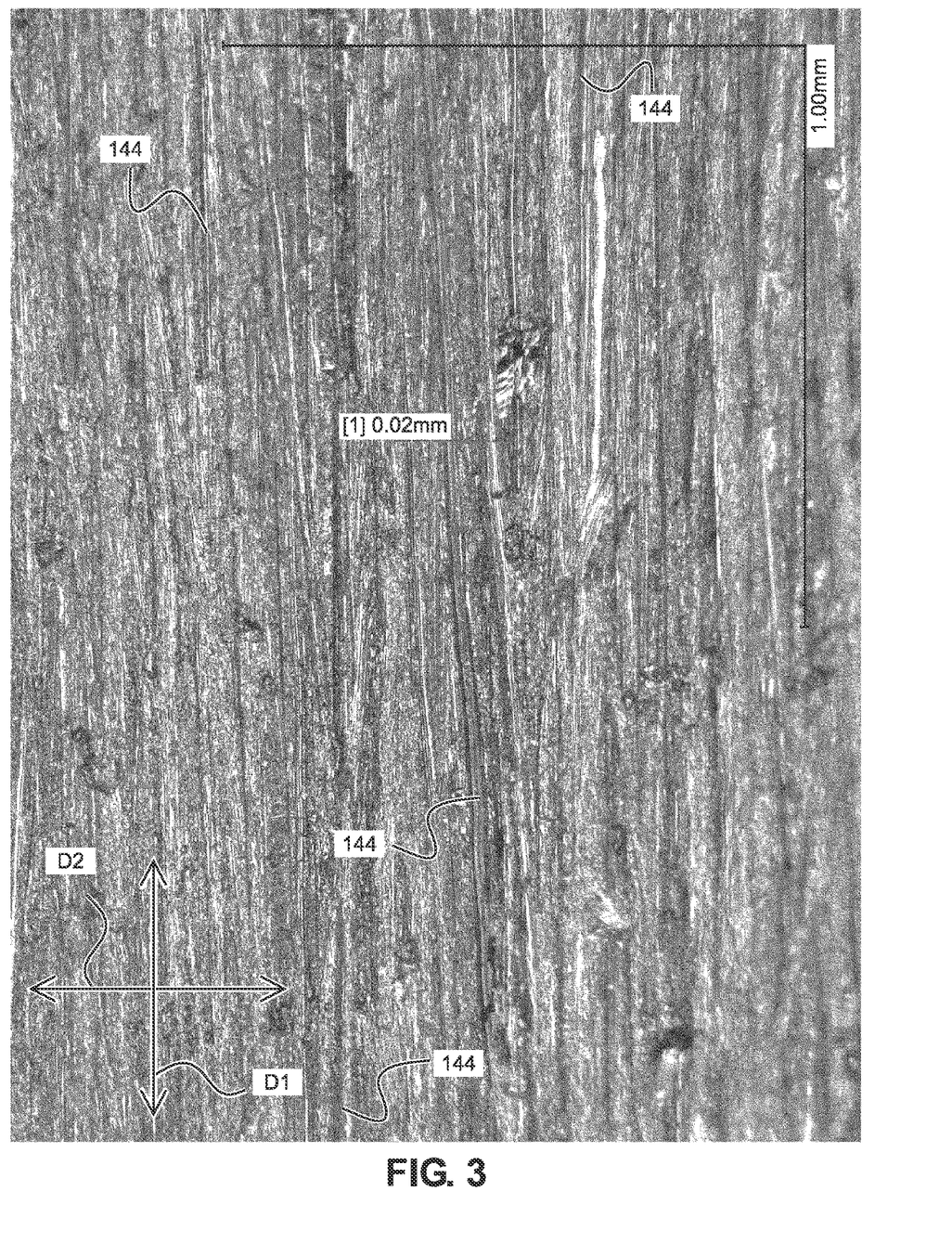
FIG. 3 is a microscope photograph of a surface of a body portion defining portion of an injection core mold.

Here, an aspect of the body portion defining portion 122 will be described with reference to FIG. 3. FIG. 3 is a captured microscope photograph of a surface of the body portion defining portion 122 of the injection core mold 102. As shown in FIG. 3, a first groove 144 that extends from the bottom portion defining portion 112 to the neck portion defining portion 132 (extends along the upper-lower direction D1 in FIGS. 2 and 3) is formed in a surface of the body portion defining portion 122. In other words, the first groove 144 extends in a direction intersecting a circumferential direction D2 of the body portion defining portion 122 in FIGS. 2 and 3. The term "intersecting" as used herein does not intend to mean that an extending direction of the first groove 144 is strictly orthogonal to the circumferential direction D2, but is used to mean that the extending direction of the first groove 144 includes an aspect of obliquely (for example, at an intersection angle of about 30° to 150°) intersecting the circumferential direction D2. However, it is preferable that the extending direction of the first groove 144 intersects the circumferential direction D2 substantially at a right angle at an intersection angle of 75° to 105° from a viewpoint of mold releasability after injection molding. A width of the first groove 144 can be set to 10 μm to 50 μm, and a depth of the first groove 144 can be set to 0.2 μm to 25 μm. Particularly, it is more desirable that the width of the first groove 144 is set in a range of 20 μm to 40 μm and the depth of the first groove 144 is set in a range of 4 μm to 14 μm.

It is preferable that a center line average roughness Ra1 of a portion of the surface of the body portion defining portion 122, in which the first groove 144 is formed, in the circumferential direction D2 is 0.2 μm or more and 15 μm or less. The "center line average roughness" is an index defined by JIS B 0601:2013. The body portion defining portion 122 whose surface is subjected to a surface roughening treatment to such an extent that the first groove 144 can be observed as a vertical stripe pattern when the body portion defining portion 122 is visually observed may be employed. Further, from a viewpoint of mold releasability, a lower limit of the center line average roughness Ra1 is more preferably 0.4 μm, and an upper limit of the center line average roughness Ra1 is more preferably 12.5 μm.

Returning to FIG. 2, the injection cavity mold 104 will be described. The injection cavity mold 104 includes an inner bottom portion 114 that defines an outer shape of the bottom portion 310 of the preform 300, an inner wall portion 124 that defines an outer shape of the body portion 320 of the preform 300, and an opening portion 134 positioned on a side opposite to the inner bottom portion 114 with the inner wall portion 124 being provided between the opening portion 134 and the inner bottom portion 114. A hot runner 400 is connected to a lower portion of the injection cavity mold 104 such that the molten resin is filled from the hot runner 400.

A second groove that extends from the inner bottom portion 114 to the opening portion 134 (extends along the upper-lower direction D1 in FIG. 2) is formed in a surface of the inner wall portion 124 of the injection cavity mold 104. In other words, the second groove extends in a direction intersecting a circumferential direction D3 of the inner wall portion 124. A width and a depth of the second groove can be set in the same ranges as those described for the first groove 144. A center line average roughness Ra3 of a portion where the second groove is formed in the circumferential direction D3 can also be set in the same range as the range of the center line average roughness Ra1 described for the injection core mold 102. The second groove can be observed in the same manner as the first groove 144 shown in FIG. 3.

Next, the temperature adjustment part 12 will be described with reference to FIG. 4. FIG. 4 is a schematic cross-sectional view showing an aspect of the temperature adjustment part. The temperature adjustment part 12 includes a temperature adjustment core mold 202 and a temperature adjustment cavity mold 204. A temperature adjustment medium such as water flows inside the temperature adjustment core mold 202 and the temperature adjustment cavity mold 204. The temperature adjustment part 12 is configured to adjust a temperature of the preform 300 while cooling the preform 300 to a temperature suitable for final blow by sandwiching the preform 300 molded by the injection molding part 11 between the temperature adjustment core mold 202 and the temperature adjustment cavity mold 204. Here, although the temperature adjustment cavity mold 204 having a single-stage configuration is shown in FIG. 4, the temperature adjustment cavity mold 204 may have a multi-stage configuration in which temperature is changed for each stage.

The temperature adjustment core mold 202 includes a body portion contact portion 222 that is in contact with the body portion 320 of the preform 300 and a bottom portion contact portion 212 that is in contact with the bottom portion 310 of the preform 300 when the preform 300 is cooled and temperature-adjusted. A portion of the temperature adjustment core mold 202 including the body portion contact portion 222 and the bottom portion contact portion 212 is tapered. The temperature adjustment core mold 202 is configured to be able to move up and down in an upper-lower direction D4 in FIG. 4.

A center line average roughness Ra2 of a surface of the body portion contact portion 222 of the temperature adjustment core mold 202 in a circumferential direction D5 is smaller than the center line average roughness Ra1 of the surface of the body portion defining portion 122 of the injection core mold 102 in the circumferential direction D2. That is, the center line average roughness Ra1 is larger than the center line average roughness Ra2. The center line average roughness Ra2 may be as high as or higher (rougher) than that employed in a related-art temperature adjustment core mold, but is preferably 0.1 μm or more and 0.4 μm or less.

Returning to FIG. 1, the blow molding part will be described. The blow molding part 13 includes a stretching rod, a blow core mold, a blow cavity mold, and the like (not shown). While stretching the preform 300 temperature-adjusted by the temperature adjustment part 12, for example, with the stretching rod, air is introduced from the blow core mold to inflate the preform 300 into a shape of the blow cavity mold, so that a container can be molded.

Figure 5:
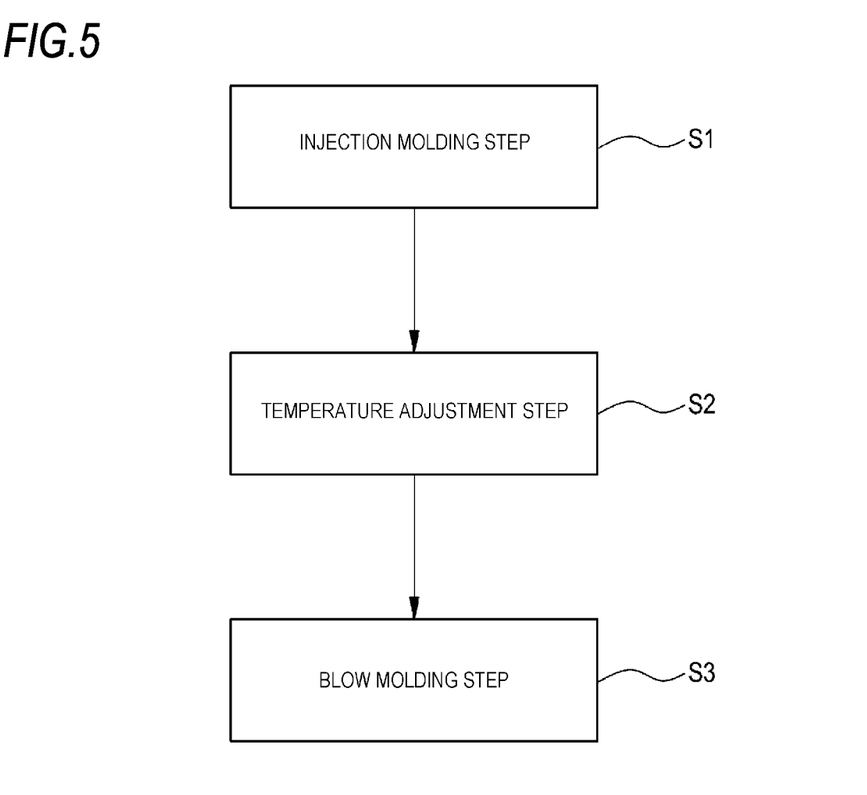
FIG. 5 is a flowchart of a method for manufacturing the resin container.

Next, a method for manufacturing the container according to the present embodiment will be described. FIG. 5 is a flowchart showing a method for manufacturing a resin container. The container of the present embodiment is manufactured through an injection molding step S1 of injection-molding the preform 300, a temperature adjustment step S2 of adjusting the temperature of the preform 300 while cooling the preform 300, and a blow molding step S3 of manufacturing the container by blow-molding the temperature-adjusted preform 300, and the container is taken out by releasing the neck portion 330 from the neck mold 17.

First, the injection molding step S1 will be described with reference to FIG. 2. In the injection molding step S1, first, the injection core mold 102, the injection cavity mold 104, and the neck mold 17 are clamped. Next, the cavity formed by the injection core mold 102, the injection cavity mold 104, and the neck mold 17 is filled with the molten resin to form the preform 300 (filling step). After a cooling step for a certain period of time (minimum) after the filling is completed, the injection core mold 102 is raised to release the preform 300 from the injection core mold 102, and then, or in parallel, the neck mold 17 is raised to release the preform 300 from the injection cavity mold 104. After the injection molding step S1, the preform 300 is moved from the injection molding part 11 to the temperature adjustment part 12.

Next, the temperature adjustment step S2 will be described with reference to FIG. 4. First, the preform 300 moved to the temperature adjustment part 12 is housed in the temperature adjustment cavity mold 204 by lowering the neck mold 17. Next, an inner surface of the preform 300 abuts against the temperature adjustment core mold 202. The abutment against the temperature adjustment core mold 202 is performed by lowering the temperature adjustment core mold 202. An order of the housing in the temperature adjustment cavity mold 204 and the abutment against the temperature adjustment core mold 202 may be reversed, or may be performed simultaneously. The preform 300 is sandwiched between the temperature adjustment cavity mold 204 and the temperature adjustment core mold 202 (sandwiching step), so that the temperature of the preform 300 is adjusted to a temperature suitable for blow molding while cooling the preform 300. Thereafter, the preform 300 is released from the temperature adjustment core mold 202 by raising the temperature adjustment core mold 202, and the preform 300 is released from the temperature adjustment cavity mold 204 by raising the neck mold 17. After the temperature adjustment step S2, the preform 300 is moved from the temperature adjustment part 12 to the blow molding part 13.

Next, the blow molding step S3 will be described. In the blow molding step S3, the preform 300 is housed in the blow cavity mold. Next, while optionally stretching the preform 300 with the stretching rod, the preform 300 is inflated into a shape of the container by introducing blow air from the blow core mold to manufacture the container. Thereafter, the container is released from a mold of the blow molding part 13, and the container is conveyed to the take-out part 14 to take out the container. The container is manufactured by the above procedure.

Incidentally, a new molding method has been developed in which a preform or a container is manufactured by significantly shortening a preform molding time, particularly a cooling time, in an injection molding part to shorten a molding cycle time. In the new molding method, the preform is released from the mold in a high-temperature state in the injection molding part, post-cooled by a temperature adjustment part or the like, and conveyed to a blow molding part. Since the preform in the high-temperature state has a thin skin layer in a hardened state and a thick core layer in a softened state, the preform is easily deformed during injection mold release. Specifically, when the injection core mold is raised and detached from the preform supported by the neck mold, the body portion and the bottom portion are wound up around the injection core mold and lifted up, and irregular deformation is likely to occur. The preform in the high-temperature state has very high flexibility, and the above-described phenomenon may occur even in a shape in which a draft angle is increased. That is, there has been a demand for a method of releasing a preform having a shape that is optimum for the new molding method, that is, a preform having a small thickness, being short, and having high stretching ratio, from the mold in a high-temperature state without deformation.

In Patent Literature 1, a gas is introduced between an injection core mold and a preform during mold release to eliminate a mold release defect, but this makes a mold and mechanical structure complicated and also increases the number of components, which may lead to an increase in cost. There has been a need to devise a method capable of improving the mold release defect with a relatively simple structure without requiring a complicated mold and a complicated mechanical structure and capable of blow-molding a container with good quality.

In a mold of Patent Literature 2, a core mold is embossed so as to facilitate removal of the core mold from a preform cooled in an injection molding step, but, as described above, the preform in a high-temperature state has very high flexibility, and it is difficult to sufficiently prevent deformation when the preform is released from the mold at a high temperature in the related-art surface roughening treatment.

In the injection core mold 102 used in the method for manufacturing the resin container of the present embodiment, the first groove 144 that extends from the bottom portion defining portion 112 to the neck portion defining portion 132 is formed in the surface of the body portion defining portion 122. In other words, the first groove 144 that extends in a removal direction of the injection core mold 102 is formed in the surface of the body portion defining portion 122. Since the first groove 144 functions as an air flow path when the injection core mold 102 is removed, it is possible to preferably prevent adhesion of the preform 300 to the injection core mold 102 in a high-temperature state as compared with the related-art injection core mold subjected to irregular processing. Accordingly, deformation of the preform 300 can be preferably prevented. Further, when a surface of the injection core mold is processed, a shape of the processed surface is transferred to the preform to some extent. In the related-art method of cooling the preform in the injection molding step, since the shape transferred to the preform may appear even in a final molded product, a shape of the processed surface of the injection core mold is limited. However, in the method for manufacturing the resin container of the present embodiment, the preform 300 is in a high-temperature state and has very high flexibility during the mold release. Therefore, as the process proceeds to a subsequent step, the transfer to the inner surface of the preform 300 is naturally reduces and becomes less noticeable. Accordingly, even when the preform 300 is released from the mold in a high-temperature state in a short molding cycle time, a high-quality resin container can be manufactured.

According to the manufacturing method of the above-described embodiment, since the first groove 144 that extends from the bottom portion defining portion 112 to the neck portion defining portion 132 is formed in the surface of the body portion defining portion 122 of the injection core mold 102 such that the center line average roughness Ra1 is 0.2 μm or more, during injection molding, minute air is allowed to preferably stay between the injection core mold 102 and the preform 300, so that an adhesion force can be reduced. Further, since the first groove 144 that extends from the bottom portion defining portion 112 to the neck portion defining portion 132 is formed in the surface of the body portion defining portion 122 of the injection core mold 102 such that the center line average roughness Ra1 is 15 μm or less, it is possible to preferably prevent the molten resin in a high-temperature state from entering the first groove 144. Accordingly, mold releasability of the preform 300 can be improved.

In the manufacturing method of the above-described embodiment, the second groove that extends from the inner bottom portion 114 to the opening portion 134 is formed in the surface of the inner wall portion 124 of the injection cavity mold 104. In other words, the second groove that extends in a removal direction of the injection core mold 102 is formed in the surface of the inner wall portion 124. When the injection core mold 102 is removed, the second groove of the inner wall portion 124 of the injection cavity mold 104 functions as an air flow path, so that it is also possible to preferably prevent adhesion of the preform 300 in a high-temperature state to the injection cavity mold 104. Accordingly, deformation of the preform 300 can be prevented more preferably. Further, in the method for manufacturing the resin container of the present embodiment, the preform 300 is in a high-temperature state and has very high flexibility during the mold release. Therefore, as the process proceeds to a subsequent step, transfer to an outer surface of the preform 300 is naturally reduced and becomes less noticeable. Accordingly, even when the preform 300 in a high-temperature state is released from the mold in a short molding cycle time, a resin container having better quality can be manufactured.

In the method for manufacturing the resin container of the present embodiment, the center line average roughness Ra1 of the surface of the body portion defining portion 122 of the injection core mold 102 in the circumferential direction D2 is larger than the center line average roughness Ra2 of the surface of the body portion contact portion 222 of the temperature adjustment core mold 202 in the circumferential direction D5. Since the center line average roughness Ra1 of the injection core mold 102 is large, minute air stays between the injection core mold 102 and the preform 300 even during injection molding and an adhesion force is reduced. Therefore, the mold releasability can be improved. Since the center line average roughness Ra2 of the temperature adjustment core mold 202 is small, a surface roughness of the preform 300 can be corrected by causing the temperature adjustment core mold 202 to be in contact with a portion on an inner side of the preform 300 conveyed via the injection molding step S1 to which a rough surface portion of the injection core mold 102 is transferred. At the same time, post-cooling and deformation correction can be performed in the sandwiching step, and a high-quality resin container can be manufactured even when the preform 300 is released from the mold in a high-temperature state in a short molding cycle time.

Further, according to the manufacturing method of the above-described embodiment, by setting the center line average roughness Ra2 to 0.1 µm or more and 0.4 µm or less, it is possible to preferably correct a surface roughness of the portion on the inner side of the preform 300 conveyed through the injection molding step S1 to which the rough surface portion of the injection core mold 102 is transferred, and it is possible to make it difficult for a transfer trace to remain in a molded container. Accordingly, even when the preform 300 is released from the mold in a high-temperature state in a short molding cycle time, a higher quality resin container can be manufactured.

In the method for manufacturing the resin container of the present embodiment, the transfer to the inner surface of the preform 300 derived from the first groove 144 formed in the surface of the body portion defining portion 122 of the injection core mold 102 is satisfactorily corrected particularly in the sandwiching step. Accordingly, even when the preform 300 is released from the mold in a high-temperature state in a short molding cycle time, a resin container of even higher quality can be manufactured.

When a surface roughening treatment is performed in a related-art injection molding mold, a finished product is further subjected to mirror finishing, and then a surface is roughened by blasting or the like. In the injection core mold 102 of the present embodiment, it is possible to obtain a desired injection core mold 102 by performing the surface roughening treatment without performing the mirror finishing treatment, and it is possible to reduce a processing cost because a related-art polishing step is not required.

The present invention is not limited to the above embodiment and may be modified or improved as appropriate. Materials, shapes, dimensions, numerical values, forms, numbers, arrangement places, and the like of components in the above embodiment are optional and not limited as long as the present invention can be achieved.

Hereinafter, aspects extracted from the above-described embodiment and modifications thereof will be listed.

[1] A method for manufacturing a resin container, the method including:

an injection molding step of injection-molding a bottomed preform made of resin; and a blow molding step of blow-molding the preform to manufacture a resin container, in which the injection molding step includes a filling step of filling a cavity formed by at least an injection core mold and an injection cavity mold with a molten resin to form the preform, in which the injection core mold includes:

a bottom portion defining portion configured to define a shape of a bottom portion of the preform;

a body portion defining portion configured to define a shape of a body portion of the preform; and a neck portion defining portion configured to define a shape of a neck portion of the preform, and in which a groove that extends from the bottom portion defining portion to the neck portion defining portion is formed in a surface of the body portion defining portion.

[2] The method for manufacturing the resin container according to [1], in which a center line average roughness Ra1 of a portion of the surface of the body portion defining portion of the injection core mold, in which the groove is formed, in a circumferential direction is 0.2 µm or more and 15 µm or less.

[3] The method for manufacturing the resin container according to [1] or [2], in which the injection cavity mold includes:

an inner bottom portion configured to define an outer shape of the bottom portion of the preform;

an inner wall portion configured to define an outer shape of the body portion of the preform; and an opening portion positioned on a side opposite to the inner bottom portion with the inner wall portion being provided between the opening portion and the inner bottom portion, and in which a groove that extends from the inner bottom portion to the opening portion is formed in a surface of the inner wall portion.

[4] The method for manufacturing the resin container according to any one of [1] to [3], further including:

a temperature adjustment step of adjusting a temperature of the injection-molded preform while cooling the preform.

[5] An injection core mold for injection-molding a bottomed preform made of resin, the injection core mold including:

a bottom portion defining portion configured to define a shape of a bottom portion of the preform;

a body portion defining portion configured to define a shape of a body portion of the preform; and a neck portion defining portion configured to define a shape of a neck portion of the preform, in which a groove that extends from the bottom portion defining portion to the neck portion defining portion is formed in a surface of the body portion defining portion.

[6] The injection core mold according to [5], in which a center line average roughness Ra1 of a portion of the surface of the body portion defining portion, in which the groove is formed, in a circumferential direction is 0.2 µm or more and 15 µm or less.

[7] An injection cavity mold for injection-molding a bottomed preform made of resin, the injection cavity mold including:
an inner bottom portion configured to define an outer shape of a bottom portion of the preform;
an inner wall portion configured to define an outer shape of a body portion of the preform; and
an opening portion positioned on a side opposite to the inner bottom portion with the inner wall portion being provided between the opening portion and the inner bottom portion,
in which a groove that extends from the inner bottom portion to the opening portion is formed in a surface of the inner wall portion.

[8] An injection molding mold including:
the injection core mold according to [5]; and
the injection cavity mold according to [7].

[9] An apparatus for manufacturing a resin container, the apparatus including:
an injection molding part configured to injection-mold a bottomed preform made of resin; and
a blow molding part configured to blow-mold the preform to manufacture a resin container,
in which the injection molding part includes the injection core mold according to [5], the injection cavity mold according to [7], or the injection molding mold according to [8].

[10] The apparatus for manufacturing the resin container according to [9], further including:
a temperature adjustment part configured to adjust a temperature of the injection-molded preform while cooling the preform.

[11] A method for manufacturing a resin container, the method including:
an injection molding step of injection-molding a bottomed preform made of resin;
a temperature adjustment step of adjusting a temperature of the injection-molded preform while cooling the preform; and
a blow molding step of blow-molding the temperature-adjusted preform to manufacture a resin container,
in which the injection molding step includes a filling step of filling a cavity formed by at least an injection core mold and an injection cavity mold with a molten resin to form the preform,
in which the injection core mold includes a body portion defining portion configured to define a shape of a body portion of the preform,
in which the temperature adjustment step includes a sandwiching step of sandwiching the preform between a temperature adjustment cavity mold and a temperature adjustment core mold,
in which the temperature adjustment core mold includes a body portion contact portion in contact with the body portion of the preform in the sandwiching step, and
in which a center line average roughness Ra1 of a surface of the body portion defining portion of the injection core mold in a circumferential direction is larger than a center line average roughness Ra2 of a surface of the body portion contact portion of the temperature adjustment core mold in a circumferential direction.

[12] The method for manufacturing the resin container according to [11],
in which the center line average roughness Ra1 of the surface of the body portion defining portion of the injection core mold in the circumferential direction is 0.2 µm or more and 15 µm or less.

[13] The method for manufacturing the resin container according to [11] or [12],
in which the center line average roughness Ra2 of the surface of the body portion contact portion of the temperature adjustment core mold in the circumferential direction is 0.1 µm or more and 0.4 µm or less.

[14] The method for manufacturing the resin container according to any one of [11] to [13],
in which the injection core mold further includes:
a bottom portion defining portion configured to define a shape of a bottom portion of the preform; and
a neck portion defining portion configured to define a shape of a neck portion of the preform, and
in which a groove that extends from the bottom portion defining portion to the neck portion defining portion is formed in the surface of the body portion defining portion.

[15] A mold unit including:
an injection core mold for injection-molding a bottomed preform made of resin; and
a temperature adjustment core mold for adjusting a temperature of the injection-molded preform while cooling the preform,
in which the injection core mold includes a body portion defining portion configured to define a shape of a body portion of the preform,
in which the temperature adjustment core mold includes a body portion contact portion in contact with the body portion of the preform when the temperature adjustment core mold adjusts a temperature of the preform while cooling the preform, and
in which a center line average roughness Ra1 of a surface of the body portion defining portion of the injection core mold in a circumferential direction is larger than a center line average roughness Ra2 of a surface of the body portion contact portion of the temperature adjustment core mold in a circumferential direction.

[16] The mold unit according to [15],
in which the center line average roughness Ra1 of the surface of the body portion defining portion of the injection core mold in the circumferential direction is 0.2 µm or more and 15 µm or less.

[17] The mold unit according to [15] or [16],
in which the center line average roughness Ra2 of the surface of the body portion contact portion of the temperature adjustment core mold in the circumferential direction is 0.1 µm or more and 0.4 µm or less.

[18] The mold unit according to any one of [15] to [17],
in which the injection core mold further includes
a bottom portion defining portion configured to define a shape of a bottom portion of the preform, and
a neck portion defining portion configured to define a shape of a neck portion of the preform, and
in which a groove that extends from the bottom portion defining portion to the neck portion defining portion is formed in a surface of the body portion defining portion.

[19] An apparatus for manufacturing a resin container, the apparatus including:
an injection molding part configured to injection-mold a bottomed preform made of resin, a temperature adjustment part configured to adjust a temperature of the injection-molded preform while cooling the preform, and a blow molding part configured to blow-mold the temperature-adjusted preform to manufacture a resin container, in which the apparatus includes the mold unit according to any one of [15] to [18].

The present application is based on Japanese Patent Applications (Japanese Patent Application No. 2019-071910 and Japanese Patent Application No. 2019-071911) filed on Apr. 4, 2019, the entire contents of which are incorporated herein by reference. Further, all references cited here are entirely incorporated.

REFERENCE SIGNS LIST

10: manufacturing apparatus
11: injection molding part
12: temperature adjustment part
13: blow molding part
14: take-out part
15: injection device
16: conveying means
17: neck mold
102: injection core mold
104: injection cavity mold
112: bottom portion defining portion
114: inner bottom portion
122: body portion defining portion
124: inner wall portion
132: neck portion defining portion
134: opening portion
144: first groove
202: temperature adjustment core mold
204: temperature adjustment cavity mold
212: bottom portion contact portion
214: body portion contact portion
300: preform
310: bottom portion
320: body portion
330: neck portion
S1: injection molding step
S2: temperature adjustment step
S3: blow molding step

The invention claimed is:

1. A method for manufacturing a resin container, the method comprising:
injection-molding a bottomed preform made of resin; and
blow-molding the preform to manufacture a resin container,
wherein the injection-molding includes filling a cavity formed by at least an injection core mold and an injection cavity mold with a molten resin to form the preform,
wherein the injection core mold includes:
a bottom portion defining portion configured to define a shape of a bottom portion of the preform;
a body portion defining portion configured to define a shape of a body portion of the preform; and
a neck portion defining portion configured to define a shape of a neck portion of the preform,
wherein a groove that extends from the bottom portion defining portion to the neck portion defining portion is formed in a surface of the body portion defining portion, and
wherein a center line average roughness Ra1 of a portion of the surface of the body portion defining portion of the injection core mold, in which the groove is formed, in a circumferential direction is 0.2 μm or more and 15 μm or less.

2. The method for manufacturing the resin container according to claim 1,
wherein the injection cavity mold includes:
an inner bottom portion configured to define an outer shape of the bottom portion of the preform;
an inner wall portion configured to define an outer shape of the body portion of the preform; and
an opening portion positioned on a side opposite to the inner bottom portion with the inner wall portion being provided between the opening portion and the inner bottom portion, and
wherein a groove that extends from the inner bottom portion to the opening portion is formed in a surface of the inner wall portion.

3. The method for manufacturing the resin container according to claim 1, further comprising:
adjusting a temperature of the injection-molded preform while cooling the preform.

4. An injection core mold for injection-molding a bottomed preform made of resin, the injection core mold comprising:
a bottom portion defining portion configured to define a shape of a bottom portion of the preform;
a body portion defining portion configured to define a shape of a body portion of the preform; and
a neck portion defining portion configured to define a shape of a neck portion of the preform,
wherein a groove that extends from the bottom portion defining portion to the neck portion defining portion is formed in a surface of the body portion defining portion, and
wherein a center line average roughness Ra1 of a portion of the surface of the body portion defining portion, in which the groove is formed, in a circumferential direction is 0.2 μm or more and 15 μm or less.

5. An injection molding mold comprising:
the injection core mold according to claim 4; and
an injection cavity mold for injection-molding the bottomed preform made of resin,
wherein the injection cavity mold includes:
an inner bottom portion configured to define an outer shape of the bottom portion of the preform;
an inner wall portion configured to define an outer shape of the body portion of the preform; and
an opening portion positioned on a side opposite to the inner bottom portion with the inner wall portion being provided between the opening portion and the inner bottom portion, and
wherein a groove that extends from the inner bottom portion to the opening portion is formed in a surface of the inner wall portion.

6. An apparatus for manufacturing a resin container, the apparatus comprising:
an injection molding part configured to injection-mold a bottomed preform made of resin; and
a blow molding part configured to blow-mold the preform to manufacture a resin container,
wherein the injection molding part includes the injection core mold according to claim 4.

7. The apparatus for manufacturing the resin container according to claim 6, wherein the injection molding part includes an injection cavity mold including:
- an inner bottom portion configured to define an outer shape of the bottom portion of the preform;
- an inner wall portion configured to define an outer shape of the body portion of the preform; and
- an opening portion positioned on a side opposite to the inner bottom portion with the inner wall portion being provided between the opening portion and the inner bottom portion, and wherein a groove that extends from the inner bottom portion to the opening portion is formed in a surface of the inner wall portion.

8. The apparatus for manufacturing the resin container according to claim 6, further comprising:
a temperature adjustment part configured to adjust a temperature of the injection-molded preform while cooling the preform.

9. The apparatus for manufacturing the resin container according to claim 8,
wherein the temperature adjustment part includes a temperature adjustment core mold configured to adjust a temperature of the injection-molded preform while cooling the preform,
wherein the temperature adjustment core mold includes a body portion contact portion in contact with the body portion of the preform when the temperature adjustment core mold adjusts the temperature of the preform while cooling the preform, and
wherein a center line average roughness Ra1 of the surface of the body portion defining portion of the injection core mold in a circumferential direction is larger than a center line average roughness Ra2 of a surface of the body portion contact portion of the temperature adjustment core mold in a circumferential direction.

10. The apparatus for manufacturing the resin container according to claim 9,
wherein the center line average roughness Ra2 of the surface of the body portion contact portion of the temperature adjustment core mold in the circumferential direction is 0.1 μm or more and 0.4 μm or less.

11. A method for manufacturing a resin container, the method comprising:
injection-molding a bottomed preform made of resin;
adjusting a temperature of the injection-molded preform while cooling the preform; and
blow-molding the temperature-adjusted preform to manufacture a resin container,
wherein the injection-molding includes filling a cavity formed by at least an injection core mold and an injection cavity mold with a molten resin to form the preform,
wherein the injection core mold includes a body portion defining portion configured to define a shape of a body portion of the preform,
wherein the temperature adjustment includes sandwiching the preform between a temperature adjustment cavity mold and a temperature adjustment core mold,
wherein the temperature adjustment core mold includes a body portion contact portion in contact with the body portion of the preform during the sandwiching, and
wherein a center line average roughness Ra1 of a surface of the body portion defining portion of the injection core mold in a circumferential direction is larger than a center line average roughness Ra2 of a surface of the body portion contact portion of the temperature adjustment core mold in a circumferential direction.

12. The method for manufacturing the resin container according to claim 11,
wherein the center line average roughness Ra1 of the surface of the body portion defining portion of the injection core mold in the circumferential direction is 0.2 μm or more and 15 μm or less.

13. The method for manufacturing the resin container according to claim 11,
wherein the center line average roughness Ra2 of the surface of the body portion contact portion of the temperature adjustment core mold in the circumferential direction is 0.1 μm or more and 0.4 μm or less.

14. The method for manufacturing the resin container according to claim 11,
wherein the injection core mold further includes:
- a bottom portion defining portion configured to define a shape of a bottom portion of the preform, and
- a neck portion defining portion configured to define a shape of a neck portion of the preform, and wherein a groove that extends from the bottom portion defining portion to the neck portion defining portion is formed in the surface of the body portion defining portion.

* * * * *